Feb. 25, 1958  T. L. RAE  2,824,674
ADJUSTABLE HOPPER AND TURNTABLE FOR CONTROLLED
DISCHARGE OF GRANULAR MATERIAL
Filed Sept. 21, 1954  2 Sheets-Sheet 1

Inventor
T. L. Rae
By
Young, Emery & Thompson
Attorneys

United States Patent Office 2,824,674
Patented Feb. 25, 1958

2,824,674

ADJUSTABLE HOPPER AND TURNTABLE FOR CONTROLLED DISCHARGE OF GRANULAR MATERIAL

Thomas L. Rae, Newton Mearns, Scotland, assignor to Keir and Cawder Limited, Glasgow, Scotland Application September 21, 1954, Serial No. 457,487

2 Claims. (Cl. 222—285)

This invention relates to a device and apparatus for controlled discharge of granular material for use in the manufacture of, for example, cement, concrete or tar macadam.

The primary object of the invention is to provide for accurate control of the weight of material discharged from the device or apparatus per unit time.

According to the invention I provide a device for controlled discharge of granular material, comprising a rotary turntable, a hopper having an outlet at its base located above said rotary turntable, a stationary wall of volute shape disposed just above said turntable and connected to said outlet to define an expanding passage for the material and diverging outwardly from said hopper in the direction of rotation of the turntable, means for effecting relative spacing adjustment between the hopper outlet and said turntable for coarse regulation of the outflow from the hopper into the expanding passage, and a gate at the outlet of the expanding passage, for fine adjustment of the outflow, whereby material within a wide range of granular sizes may be discharged in accurately predetermined quantities per unit time.

Embodiments of the invention will now be described, by way of example, with reference to the accompanying drawings, in which.

Figure 1:
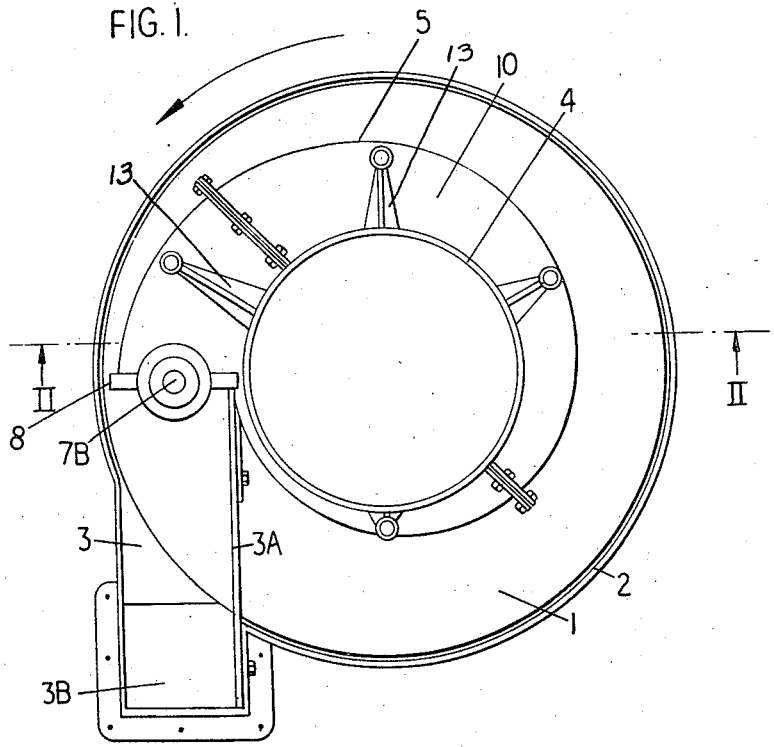
Fig. 1 is a plan view of a device according to the invention.
Figure 2:
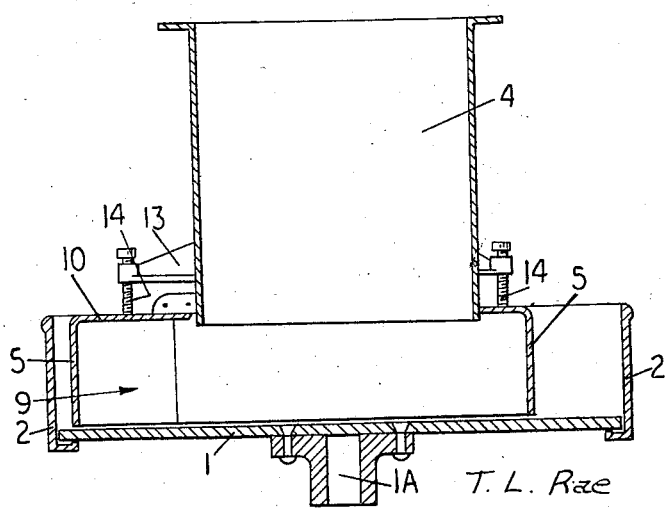
Fig. 2 is a sectional elevation on the line 11—11 of Fig. 1.
Figure 3:
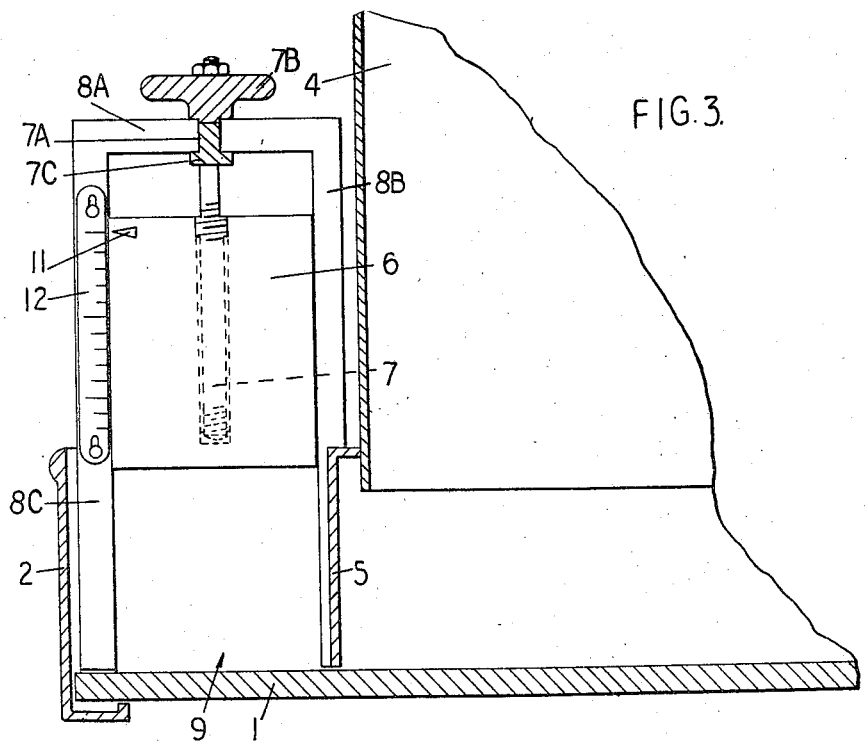
Fig. 3 is an elevation of an adjustable discharge control gate.

Referring to Figs. 1 to 3, a device for controlled discharge of granular material comprises a turntable 1, an interrupted outer cylindrical casing 2, a tubular hopper 4 above and co-axial with the turntable 1, a stationary wall 5 of volute form in plan originating at the lower end of hopper 4 and terminating near the casing 2 at a position radially outward from its origin, and a gate 6 vertically adjustable in a frame 8 extending radially between the ends of the wall 5. The turntable 1 is mounted for rotation on a vertical spindle 1A. The interrupted casing 2 has, at the interruption, a discharge branch 3 leading to a chute 3B. A wall 3A, associated with the discharge branch 3, extends across the turntable 1 to a vertical face 8B of the frame 8 to guide granular material being carried round by the turntable 1 into the chute 3B. The frame 8 consists of a cross-bar 8A and two vertical side members 8B and 8C. Vertical adjustment of the gate 6 is effected by rotation of a screw 7 engaging in a threaded recess in the gate. The screw 7 is adapted for manual rotation in a bearing 7A in the cross-bar 8A by means of a handle 7B, and is held against vertical movement by engagement of the handle 7B and a flange 7C with the cross-bar 8A. The hopper 4, wall 5 and turntable 1 co-operate to form a channel 9, which has a roof 10 in the form of an inwardly directed flange at the top of wall 5. A pointer 11 fixed to the gate 6 co-operates with a calibrated scale 12 presented on the vertical face 8C of the frame 8 to indicate the vertical position of the gate. Arms 13 projecting radially outwards from the hopper 4 intermediate its ends each carry a vertically adjustable depending screw 14, the lower end of which bears on the roof 10 of the channel 9 to sustain the hopper in position and allow for vertical adjustment thereof relative to the turntable 1.

In practice, granular material placed in the hopper 4 is fed therefrom to the turntable 1 by gravity. On rotation of the turntable 1 by the spindle 1A in the direction of increasing width of the channel 9, the granular material is thrown out to the wall 5 by centrifugal force and carried around by the turntable 1 to the frame 8 and discharge branch 3, the wall 5 serving as a guide. The height of the lower end of the hopper 4 above the turntable 1 may be adjusted by screws 14 to regulate the feed of granular material to the turntable. Thus, in the case of a slow flowing material of large granules, the lower end of the hopper may be positioned at or about the level of the roof 10 of channel 9. Alternatively, in the case of a fast or free flowing material of small granules, the lower end of the hopper may be positioned just above the turntable 1. Discharge of granular material through the frame 8 to discharge branch 3 is regulated by adjusting the height of gate 6 by rotation of screw 7, so that the quantity of granular material discharged per unit time through the opening beneath the gate is readily controllable. Alternatively, the quantity of material discharged per unit time may be controlled by adjusting the speed of rotation of the turntable 1.

In a modification of the device the scroll volute wall may be dispensed with, the outer casing serving as guide for the granular material, but the scroll volute form is preferred as it gives rise to the following advantages:

(1) Material advances circumferentially in steadily increasing cross section area.

(2) Internal friction of material is reduced and hence horse power required to drive is reduced.

(3) Reduction in internal pressure increases efficiency of the control of material passing gate, i. e., allows a constant pressure which will give a constant compaction of material.

What I claim is:

1. Device for controlled discharge of granular material, comprising a rotary turntable, a hopper having an outlet at its base located above said rotary turntable, a stationary wall of volute shape disposed just above said turntable and connected to said outlet to define an expanding passage for the material and diverging outwardly from said hopper in the direction of rotation of the turntable, means for effecting relative spacing adjustment between the hopper outlet and said turntable for coarse regulation of the outflow from the hopper into the expanding passage, and a gate at the outlet of the expanding passage, for fine adjustment of the outflow, whereby material within a wide range of granular sizes may be discharged in accurately predetermined quantities per unit time.

2. Device according to claim 1, including a roof extending from the top of the stationary wall to the side of the hopper.

References Cited in the file of this patent

UNITED STATES PATENTS

| | | |
|---|---|---|
| 501,583 | Thompson et al. | July 18, 1893 |
| 721,554 | Fetzer | Feb. 24, 1903 |
| 1,038,733 | Durstewitz | Sept. 17, 1912 |
| 1,061,348 | Willford | May 13, 1913 |
| 1,764,108 | Kennedy | June 17, 1930 |
| 1,801,980 | Robinson et al. | Apr. 21, 1931 |
| 2,160,101 | Horsfield | May 30, 1939 |
| 2,329,948 | Shallock | Sept. 21, 1943 |
| 2,643,026 | Craig et al. | June 23, 1953 |